US011307424B2

(12) United States Patent
Coatney

(10) Patent No.: US 11,307,424 B2
(45) Date of Patent: Apr. 19, 2022

(54) VIRTUAL REALITY/AUGMENTED REALITY RAPID DEPLOYMENT SYSTEM

(71) Applicant: Universal City Studios LLC, Universal City, CA (US)

(72) Inventor: James Jeffrey Coatney, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/063,402

(22) Filed: Oct. 5, 2020

(65) Prior Publication Data
US 2021/0018757 A1    Jan. 21, 2021

Related U.S. Application Data

(63) Continuation of application No. 16/201,719, filed on Nov. 27, 2018, now Pat. No. 10,838,216.
(Continued)

(51) Int. Cl.
*A63G 7/00* (2006.01)
*G02B 27/01* (2006.01)
(Continued)

(52) U.S. Cl.
CPC ........... *G02B 27/0176* (2013.01); *A63G 7/00* (2013.01); *A63G 21/00* (2013.01); *A63G 31/16* (2013.01);
(Continued)

(58) Field of Classification Search
CPC .......... A63G 7/00; A63G 31/00; A63G 31/16; G09B 9/00; G09B 9/05; G09G 5/00
(Continued)

(56) References Cited

U.S. PATENT DOCUMENTS

| 4,795,209 A | 1/1989 | Quinlan, Jr. et al. |
| 4,900,086 A | 2/1990 | Steward |

(Continued)

FOREIGN PATENT DOCUMENTS

| CN | 107438787 A | 12/2017 |
| EP | 3213800 | 6/2017 |

(Continued)

OTHER PUBLICATIONS

Sharon Kennedy Wynne; Sneak peek: We rode SeaWorld's Kraken coaster while wearing virtual reality goggles:; Tampa Bay Times, published Jun. 15, 2017; [http://www.tampabay.com/things-to-do/travel/florida/sneak-peek-we-rode-seaworlds-kraken-coaster-while-wearing-virtual-reality/2327368; 11 pgs.
(Continued)

*Primary Examiner* — Kien T Nguyen
(74) *Attorney, Agent, or Firm* — Fletcher Yoder, P.C.

(57) ABSTRACT

A system includes a head-mounted virtual reality/augmented reality (VR/AR) display system, comprising a processor, wherein the processor is configured to display an image on a graphical display of the head-mounted VR/AR display system. The system further includes a scaffolding system comprising a headpiece configured to be worn by a user; wherein the headpiece comprises at least one fastener configured to fasten and unfasten the head-mounted VR/AR display system to the headpiece, and configured to fasten and unfasten a headgear to the headpiece.

20 Claims, 9 Drawing Sheets

Related U.S. Application Data

(60) Provisional application No. 62/619,618, filed on Jan. 19, 2018.

(51) Int. Cl.
*A63G 31/16* (2006.01)
*A63G 21/00* (2006.01)
*G06T 19/00* (2011.01)
*G09B 9/05* (2006.01)

(52) U.S. Cl.
CPC .... *G06T 19/006* (2013.01); *G02B 2027/0156* (2013.01)

(58) Field of Classification Search
USPC ......... 472/43, 59–61, 130; 345/7–9; 434/29, 434/38, 43, 62, 69
See application file for complete search history.

(56) References Cited

U.S. PATENT DOCUMENTS

| | | | |
|---|---|---|---|
| 5,412,811 | A | 5/1995 | Hildenbrand et al. |
| 5,469,578 | A | 11/1995 | Mattes |
| 5,572,749 | A | 11/1996 | Ogden |
| 5,796,374 | A | 8/1998 | Cone et al. |
| 6,179,619 | B1 | 1/2001 | Tanaka |
| 6,343,858 | B1 | 2/2002 | Zelman |
| 6,496,161 | B1 * | 12/2002 | Tanaka ............... G02B 27/0176 345/7 |
| 6,931,668 | B2 | 8/2005 | Dobbie et al. |
| 7,185,909 | B2 | 3/2007 | Espenshade et al. |
| 8,025,581 | B2 | 9/2011 | Bryan et al. |
| 2003/0070200 | A1 | 4/2003 | Crye et al. |
| 2004/0008157 | A1 | 1/2004 | Brubaker et al. |
| 2006/0037125 | A1 | 2/2006 | McDowell |
| 2013/0312163 | A1 | 11/2013 | Van Waes |
| 2014/0304891 | A1 | 10/2014 | Waters |
| 2015/0074878 | A1 | 3/2015 | Teetzel et al. |
| 2015/0122849 | A1 | 5/2015 | Jones |
| 2015/0234189 | A1 | 5/2015 | Jones |
| 2017/0236328 | A1 | 8/2017 | Eatedali et al. |
| 2017/0345198 | A1 | 11/2017 | Magpuri et al. |

FOREIGN PATENT DOCUMENTS

| | | |
|---|---|---|
| WO | 2013187235 | 12/2013 |
| WO | 2014199159 A1 | 12/2014 |

OTHER PUBLICATIONS

Seth Porges; "How Universal Orlando's New Haunted House Is Pushing VR Tech To Its Limits"; Oct. 3, 2016; [https://www.forbes.com/sites/sethporges/2016/10/03/how-universals-new-haunted-house-is-pushing-vr-tech-to-its-limits/#ab4900737b7f]; 4 pgs.

Google Daydream VR Headset (retrived Oct. 2017 from https://arvr.google.com/daydream/); 6 pga.

GoPro Head Strap (Anonymous); [retrieved Oct. 2017 from https://shop.gopro.com/mounts/head-strap-plus-quickclip/ACHOM-001.html] 4 pgs.

PCT/US2018/064539 Invitation to Pay Additional Fees dated Mar. 1, 2019.

PCT/US2018/064539 International Search Report and Written Opinion dated Apr. 26, 2019.

RU 2020127396 Office Action dated Dec. 17, 2021.

\* cited by examiner

VIRTUAL REALITY/AUGMENTED REALITY RAPID DEPLOYMENT SYSTEM

CROSS-REFERENCE TO RELATED APPLICATIONS

This is a continuation of U.S. patent application Ser. No. 16/201,719, filed Nov. 27, 2018; which claims priority to and the benefit of U.S. Provisional Application No. 62/619,618 filed Jan. 19, 2018, both of which are hereby incorporated by reference in their entirety for all purposes.

FIELD OF DISCLOSURE

The present disclosure relates generally to the field of virtual reality and/or augmented reality. More specifically, embodiments of the present disclosure relate to systems and methods utilized to provide for rapid deployment of virtual reality and augmented reality experiences.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Various amusement rides have been created to provide passengers with unique motion and visual experiences. For example, virtual reality and/or augmented reality systems may be used in conjunction with theme rides and can be implemented with multi-passenger vehicles that travel along a fixed path. In addition to the excitement created by the speed or change in direction of the vehicles as they move along the path, the virtual reality and augmented reality systems themselves may generate special effects (e.g., graphic and/or sound effects) that are presented to the passenger. Although a repeat rider may be familiar with the general path of the ride, the special effects may create interest during second and subsequent rides. In another example, certain rides may be implemented with virtual projection elements to create varying scenery and movement as the passenger vehicles travel along the path, to add an immersive experience. Donning and subsequently removing the virtual and/or augmented reality systems from each passenger takes time. Accordingly, it is now recognized that there is a need for improved virtual and/or augmented reality systems that may be deployed more rapidly.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a head-mounted virtual reality/augmented reality (VR/AR) system, including a processor, wherein the processor is configured to display an image on a graphical display of the head-mounted VR/AR display system. The system further includes a scaffolding system including a headpiece configured to be worn by a user; wherein the headpiece includes at least one fastener configured to fasten and unfasten the head-mounted VR/AR display system to the headpiece, and configured to fasten and unfasten a headgear to the headpiece.

In accordance with another embodiment, a passenger vehicle includes a head-mounted virtual reality/augmented reality (VR/AR) system. The head-mounted VR/AR display system includes a processor, wherein the processor is configured to display an image on a graphical display of the head-mounted VR/AR display system. The head-mounted VR/AR display system further includes a fastener configured to fasten and unfasten the head-mounted VR/AR display system to a headpiece included in a scaffolding system, wherein the headpiece is configured to be worn by a user of the passenger vehicle.

In accordance with another embodiment, a system includes a scaffolding system including a headpiece configured to be worn by a user. The headpiece includes at least one fastener configured to fasten and unfasten a head-mounted virtual reality/augmented reality (VR/AR) system to the headpiece, and configured to fasten and unfasten a headgear to the headpiece.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
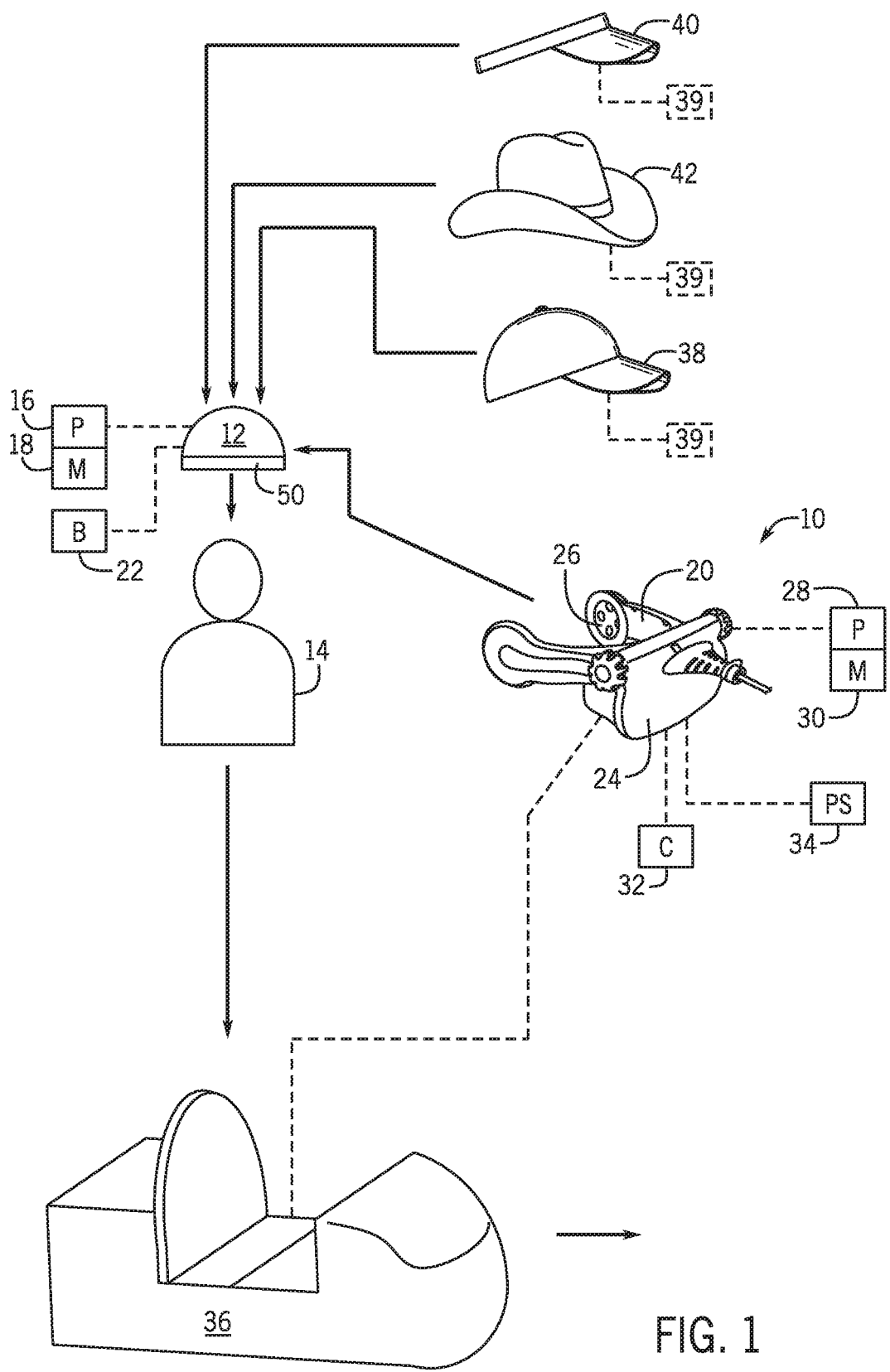
FIG. 1 is a schematic representation of an embodiment of a rapid deployment virtual reality/augmented reality system in the context of an amusement park ride, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments of the disclosure are directed to rapid deployment virtual/augmented reality (VR/AR) systems that may be used, for example, as part of an amusement park ride or attraction. Amusement park rides may include passenger vehicle rides in which single-passenger and/or multi-passenger vehicles carry passengers along a fixed track. Passengers may sit inside the passenger vehicle and be secured via a passenger retention system. The passenger vehicle may then proceed at varying speeds along the fixed path. Adding VR/AR systems to enhance the passenger experience would be beneficial. However, extra time to don, to doff, and to prepare a VR/AR system for the next ride iteration may result in a total ride time long enough to make the use of virtual/augmented reality systems difficult and/or not financially viable.

The rapid deployment virtual/augmented reality systems described herein may be more easily donned and doffed by a passenger while being seated in a passenger vehicle, and may be more easily prepared by ride personnel for the next ride iteration. In certain embodiments, the virtual/augmented reality systems may include a scaffolding system that includes a single-piece headpiece or a unitary headpiece that may come in various sizes. The headpiece may be donned by a passenger before being seated in the passenger vehicle. For example, the headpiece may be provided before the start of the ride and fitted to the passenger while the passenger is waiting in line to enter the passenger vehicle.

The headpiece may be adjusted using certain fastening techniques, as further described herein, that may enable the improved mating and removal of VR/AR display systems, such as VR/AR goggles. The fastening techniques may additionally permit the fastening of non VR/AR headgear, such as ball caps, hats, and so on, when the VR/AR display system is not in use. Indeed, the headpiece may be used to support both VR/AR display systems as well as other headgear, depending on desired use. The headgear may include ball caps, cowboy hats, other hats, head umbrellas, and so on, useful for protection from the elements as well as for expression of various fashions by a theme park attendee. That is, the headgear may be part of the rapid deployment virtual/augmented reality system and may augment the overall ride narrative (e.g., an astronaut helmet, a hard hat), or may be the user's own headgear. Accordingly, in one embodiment, the rapid deployment virtual/augmented reality system may be configured to be used in conjunction with the user's own baseball cap or other headgear so that the user feels more comfortable. By providing for rapid deployment VR/AR systems, the techniques described herein may enable faster and more efficient theme rides.

While embodiments of the present disclosure are discussed in the context of vehicle-based rides, it should be understood that the rapid deployment VR/AR systems disclosed herein may be used with other types of amusement attractions that would benefit from greater efficiency in attraction unloading and loading that may be achieved using the disclosed techniques. For example, the present techniques may be used in conjunction with non-vehicle based attractions or shows. In one example, the rapid deployment VR/AR system may be used in conjunction with show seating.

FIG. 1 is a schematic representation of a rapid deployment VR/AR system 10 in accordance with aspects of the present disclosure. As depicted, a scaffolding system 12 is provided, which may include a headpiece 50 suitable for placement on a user's head as further described below. The scaffolding system headpiece 50 may be provided in different sizes and/or shapes suitable for use by a variety of passengers 14 of various ages, and may be adjustable. In certain embodiments, the scaffolding system 12 may include one or more processors 16 and one or more memory devices 18. The processor(s) 16 may include multiple microprocessors, one or more other integrated circuits (e.g., application specific integrated circuits, field programmable gate arrays, reduced instruction set processors, and the like), or some combination thereof. The one or more processors 16 and one or more memory devices 18 may be integral with the headpiece 50 or may be part of a separate or removable component that may also be donned and doffed.

The one or more memory devices 18 may include a tangible, non-transitory, machine-readable-medium, such as a volatile memory (e.g., a random access memory (RAM)), one or more storage devices (e.g., nonvolatile storage devices) that may include read-only memory (ROM), flash memory, a hard drive, or any other suitable optical, magnetic, or solid-state storage medium, or any combination thereof. The memory device(s) 18 may store a variety of information and be used for various purposes. For example, the memory device(s) 18 may store machine-readable and/or processor-executable instructions (e.g., firmware or software) for the processor(s) 16 to execute, such as instructions to determine a type of VR/AR display system 20 to interface with. The instructions may further include user profiles specific to each user 14 that may detail user information (e.g., age, gender) and/or user preferences for the VR/AR display system 20 (e.g., font size, volume, display resolution). The scaffolding system 12 may further include a battery power supply 22 suitable for providing power to the scaffolding system 12 and/or to the VR/AR display system 20.

The VR/AR display system 20 may include a graphics display system 24, such as goggles, that may display or project media such as images, video, text, and so on. The VR/AR display system 20 also may include an audio system 26 that may project sound, for example to the user's ears binaurally. Processor(s) 28 and one or more memory devices 30 may also be included. The processor(s) 28 may include multiple microprocessors, one or more other integrated circuits (e.g., application specific integrated circuits, field programmable gate arrays, reduced instruction set processors, and the like), or some combination thereof. The one or more memory devices 30 may include a tangible, non-transitory, machine-readable-medium, such as a volatile memory (e.g., RAM), one or more storage devices (e.g., nonvolatile storage devices) that may include ROM, flash memory, a hard drive, or any other suitable optical, magnetic, or solid-state storage medium, or any combination thereof. The memory device(s) 30 may store a variety of information and be used for various purposes. For example, the memory device(s) 30 may store machine-readable and/or processor-executable instructions (e.g., firmware or software) for the processor(s) 28 to execute, such as instructions to display or to project images, text, video, audio, and so on, via the VR/AR display system 20.

The VR/AR display system 20 may include a communications interface 32 suitable for communicating with external systems (e.g., computing systems such as servers, notebooks, smartphones, laptops, tablets, smartwatches, and so on) via wired techniques (e.g., Ethernet conduits, universal serial bus (USB) conduits, high definition multimedia interface (HDMI) conduits, and so on), and/or wireless techniques (e.g., WiFi, mesh networks, Bluetooth, Zigbee, and so on). The VR/AR display system 20 may also include or operatively couple with a power supply system 34 that provides electrical power to the VR/AR display system 20 and/or to the scaffolding system 12.

It is to be understood that the VR/AR display system 20 may use VR techniques, AR techniques, or a combination thereof. For example, the VR techniques may include presenting sensory information (e.g., images including video, sound, haptic feedback, force feedback, smell) that may immerse the user 14 in a 3-dimensional (3D) (and/or a 2-dimensional (2D)) environment. AR techniques may include superimposing a 2D and/or 3D environment onto user's 14 view of the real world, thus providing a composite view (e.g., real world view augmented with a computer-derived view) and enhancing the theme park ride.

In use, the passengers 14 may don the scaffolding system 12 by placing the scaffolding system headpiece 50 onto their heads and then proceeding in line for entry into a single or multi-passenger vehicle 36. In certain embodiments, the VR/AR display system 20 may be disposed in the passenger vehicle 36. Accordingly, upon entry into the passenger vehicle 36, the passengers 14 may already have the scaffolding system headpiece 50 in place, and may then toollessly mate the VR/AR display system 20 with the scaffolding system 12. For example, a toolless mating may involve a successful mating without any additional components other than the scaffolding system 12 and the VR/AR display system 20. That is, the scaffolding system 12 and the VR/AR display system 20 carry (integrally or otherwise coupled to one of the scaffolding system 12 or the VR/AR display system 20) all components to achieve successful mating between them. Further, the scaffolding system 12 and the VR/AR display system 20 may also be configured for toolless uncoupling from one another.

Techniques further described below permit a faster and improved mating of the VR/AR display system 20 with the scaffolding system 12 so that queues of passengers 14 may move more efficiently and so that the reuse of the VR/AR display system 20 may be improved. Further, the techniques described herein provide for non-VR/AR headgear such as, ball caps 38, head umbrella or tennis cap 40, hats 42, and so on. It is it be understood that the non-VR/AR headgear may include a variety of hats, caps (e.g., baseball caps, golf caps, visors, small umbrellas worn as a headcover, and so on). Indeed, the users 14 may purchase a variety of non-VR/AR headgear to mate with the scaffolding system 12 by using the same of similar mating techniques that may be used to mate the VR/AR display system 20 to the scaffolding system 12. Accordingly, the scaffolding system (e.g., the headpiece 50) may include a separate mating feature configured to mate with the headgear. To eliminate miscoupling, the headgear mating feature may be configured not to couple to the VR/AR display system 20. In certain embodiments, the headgear 38, 40, 42 may not include any electronics. In other embodiments, the headgear 38, 40, 42 may include certain devices 39 such as lights (e.g., LED lights), low voltage displays (e.g., OLED, E-ink, and so on), and the like, useful in displaying logos, animations, and so on, which may be powered via the battery power supply system 22. The devices 39 may also include radio frequency identification (RFID) tags useful in identifying the type of headgear 38, 40, 42. For example, the scaffolding system 12 may identify via processor(s) 16 that the headgear worn is the ball cap 38 and display certain logos, provide discounts at point-of-sale terminals, track frequent user points, and so on on the headgear. In an embodiment, the headgear may act as an AR feature for AR display systems 20, such that users 14 wearing the headgear are indicated as having a particular designation or appearance via the AR display.

Figure 2:
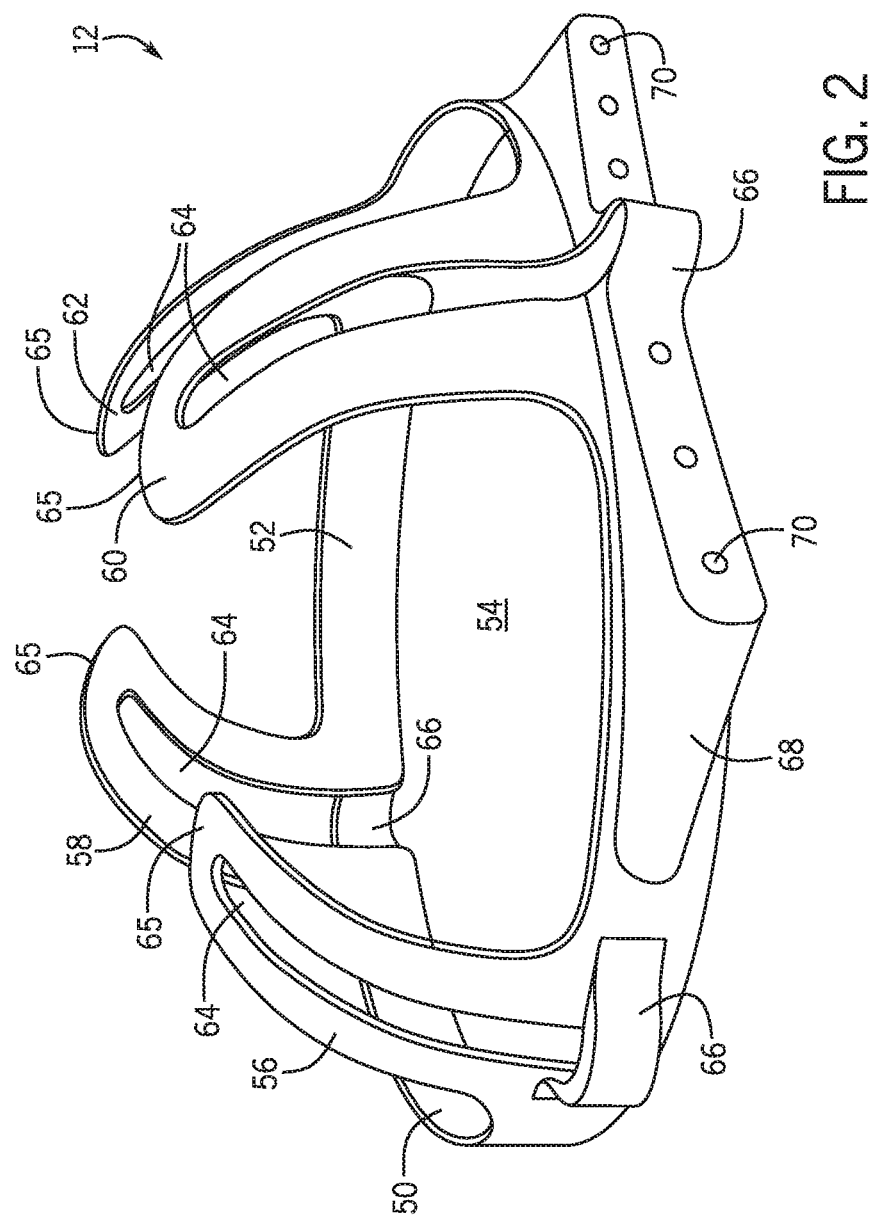
FIG. 2 is perspective view of an embodiment of a scaffolding system headpiece suitable for use in conjunction with the rapid deployment virtual reality/augmented reality system of FIG. 1 on a user's head, in accordance with an aspect of the present disclosure.

FIG. 2 is a perspective view of an embodiment of the headpiece 50 of the scaffolding system 12. In the depicted embodiment, the headpiece 50 is single piece (e.g., single component or unitary assembly) that may be molded, extruded, 3D printed, and so on, from a variety of materials such as acrylonitrile butadiene styrene (ABS), phthalate-free polyvinyl chloride (PVC), polyethylene terephthalate (PET), low-density polyethylene (LDPE), polypropylene, silicone, polyamide, plastics of various types, metals, and the like. The headpiece 50 may be manufactured in various shapes and/or sizes, (e.g., small, medium, large, extra large), to accommodate users 14 of varying head anatomies. Accordingly, in one embodiment, the headpiece 50 may not have adjustable components (e.g., buckles, straps) that change the headpiece size or configuration. Instead, the user 14 selects a closest size among different headpieces 50.

The headpiece 50 may include a headband section 52, which may be manufactured in a circular shape, an oval shape, an elliptical shape, and so on, forming an opening 54 suitable for the insertion of a user's head. In the depicted embodiment, four curved prong sections 56, 58, 60, 62 extend outwardly from the headband section 52 to encircle and be supported by a user's head when in use. Each curved prong section 56, 58, 60, 62 may include a slot 64 extending from the headband section 52 towards a tip 65 of each respective curved prong section 56, 58, 60, 62. The slots 64 may be useful in providing ventilation and in reducing an overall weight of the headpiece 50. In use, the tip 65 may be disposed on a crown section of the user's head. It is to be understood that while the depicted embodiment shows four curved prong sections 56, 58, 60, 62, other embodiments may include fewer or more curved prong sections.

In certain embodiments, certain mechanical and/or magnetic attachment techniques may be used to mate the VR/AR display system 20 to the headpiece 50. For example, ledges or female receptacles 66 may be used to support the VR/AR display system 20 and/or to mate with certain protrusions included in the VR/AR display system 20. Additionally or alternatively a forehead shelf section 68 may provide an attachment area for the VR/AR display system 20 and may be proximate to the user's 14 forehead when in use. For example, the shelf section 68 may include one or more magnets 70 (e.g., rare earth magnets) disposed along a length of the shelf section 68.

The magnets 70 may magnetically couple with corresponding magnets on the VR/AR display system 20 to aid in securing the VR/AR display system 20 while in use, e.g., fastening in a toolless manner. The magnets 70 may aid in providing for an improved attachment mechanism that may use simple movements to place and secure the VR/AR display system 20 while the headpiece 50 is on the user's 14 head. Indeed, the magnets 70 may, through a magnetic "pull", guide the VR/AR display 20 into a desired position on the headpiece 50. The magnets 70 may also be disposed in other sections of the headpiece 50, for example along the circumference of the headband section 52, on the curved prong sections 56, 58, 60, 62, and/or on the ledges 66. The magnets 70 may be electrically conductive, thus providing for signals and/or power to/and from the VR/AR display system 20 and/or to and from the headgear 38, 40, 42. In this manner, the VR/AR display system 20 may be quickly placed on the user 14. Further, the headpiece 50 may be separately attached, fitted, adjusted, and/or secured for the comfort of the user 14 without the bulk and weight of the VR/AR display system 20 interfering with the user 14 achieving a comfortable fit. In addition, the donning of the scaffolding system 12 may be performed in a separate waiting area that may be less secure than the area holding the costlier VR/AR display systems 20. This may be beneficial, because users 14 may wish to move more freely as they adjust or select different headpieces 50 and/or assist family members. Further, the donning or doffing process for the headpiece 50 may be more prone to causing the headpiece 50 to fall. By removing this process from the coupling of the VR/AR display system 20, headpiece falls during donning or doffing will not cause damage to the VR/AR display system 20. Instead, the VR/AR display system 20 is fastened when the headpiece 50 of the scaffolding system 12 is already securely positioned on the user 14 and, similarly, is removed from the headpiece 50 before the headpiece 50 itself is taken off the user's head.

Figure 3:
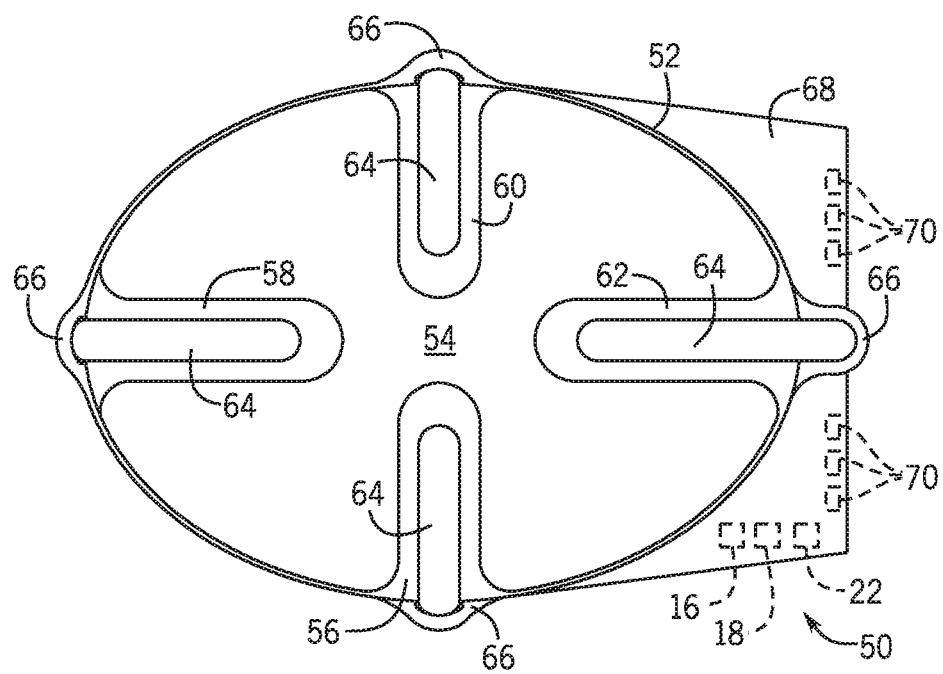
FIG. 3 is a top view of an embodiment of the headpiece of FIG. 2, in accordance with an aspect of the present disclosure.

FIG. 3 is a top view of an embodiment of the headpiece 50. As mentioned earlier, the headpiece 50 may be a single piece (or multiple assembled pieces) or component that may be molded, extruded, 3D printed, and so on, from a variety of materials. In the depicted embodiment, the headpiece 50 includes the headband section 52 having an oval shape that defines the opening 54. Also shown are the four curved prong sections 56, 58, 60, 62, each having the slot 64 and the ledges 66.

The figure also depicts the forehead shelf section 68, which may include the magnets 70. As mentioned above, the magnets 70 may be electrically conductive to providing for the transmission of electrical signals and/or power. In embodiments of the headpiece 50 that include the processor 16, the memory 18, and/or the battery power supply 22, the shelf section 68 may also be used as a repository for the processor 16, the memory 18, and/or the battery power supply 22.

Figure 4:
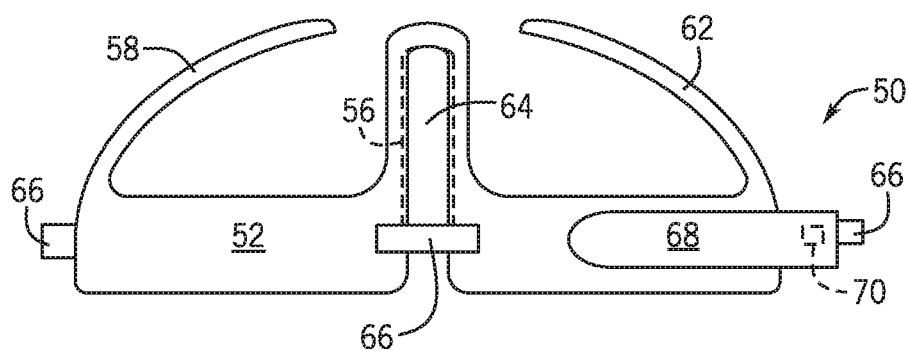
FIG. 4 is a side view of an embodiment of the headpiece of FIG. 2, in accordance with an aspect of the present disclosure.

Turning now to FIG. 4, the figure is a side view of an embodiment of the headpiece 50 showing the headband section 52 and three curved prong sections 56, 58, and 62 extending outwardly from the headband section 52. Also shown are the shelves 66 disposed about head band section 52 and extending from the slots 64. To don the headpiece 50, the user 14 may insert his or her head through the opening 54 until the curved prong sections 56, 58, 60, 62 abut the head, as shown in FIG. 5.

Figure 5:
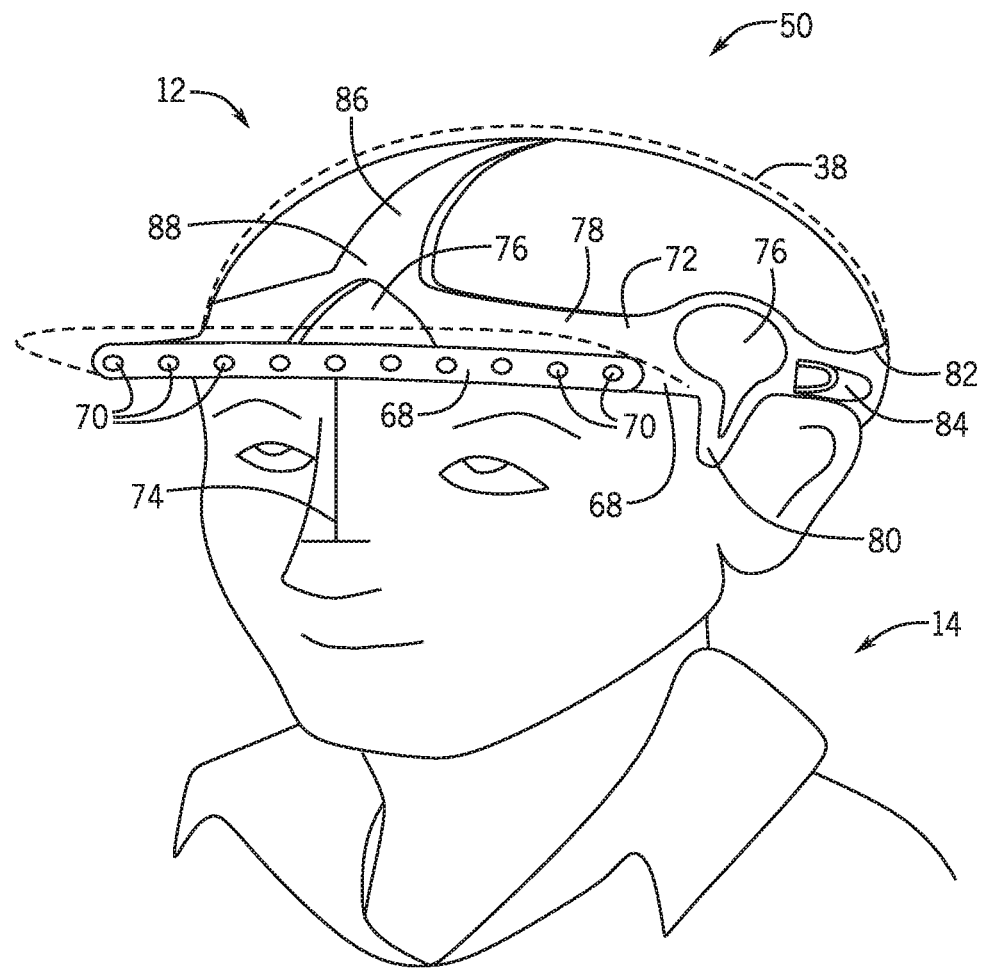
FIG. 5 is a perspective view of an embodiment of the headpiece of FIG. 2 disposed on a user's head, in accordance with an aspect of the present disclosure.

FIG. 5 is a perspective of an embodiment of the scaffolding system headpiece 50 disposed on the users head. As depicted, the headpiece 50 is disposed onto the head of the user 14 so that the shelf section 68 is positioned over the user's 14 eyes. The depicted embodiment of the headpiece 50 additionally includes a nose support section 74 that may be used for further support a weight of the VR/AR display system 20. Also shown in the depicted embodiment is the ball cap 38 disposed onto the headpiece 50. As mentioned earlier, non-VR/AR headgear, such as the ball cap 38, may be placed on a complementary mating feature of the scaffolding system 12, for example, for use when walking around a theme park. That is, the headpiece 50 or the scaffolding system 12 including the headpiece 12 may be a universal headpiece 50 that may be used for multiple rides. Instead of using park-provided borrowed headpieces 50, the user 14 may have a personal headpiece 50 or scaffolding system 12 including the headpiece 50 that is worn throughout the park visit and that couples to different VR/AR display systems 20 of the various attractions. However, because the user 14 may find the headpiece 50 or scaffolding system 12 including the headpiece 50 unsightly, various headgear may be provided to cover the functional features. The headgear may be selectable and/or swappable depending on the user preferences.

In the depicted embodiment, the headpiece 50 includes openings 76 in a headband section 78 of the headpiece 50. Some of the openings 76 may be formed around temple sections 80. The temple sections 80 and ledges 82 may further aid is supporting the weight of the VR/AR display system 20. Female receptacles 84 may also be used, for example, to mate with protrusions of the VR/AR display system 20 for further attachment of the VR/AR display system 20 to the headpiece 50. Also shown is a crown band section 86, which may extend outwardly from the headband section 78 and be disposed over the user's head. In some embodiments, the crown band section 86 may connect to the headband section 78 at a fore end 88 and at an aft end.

Figure 6:
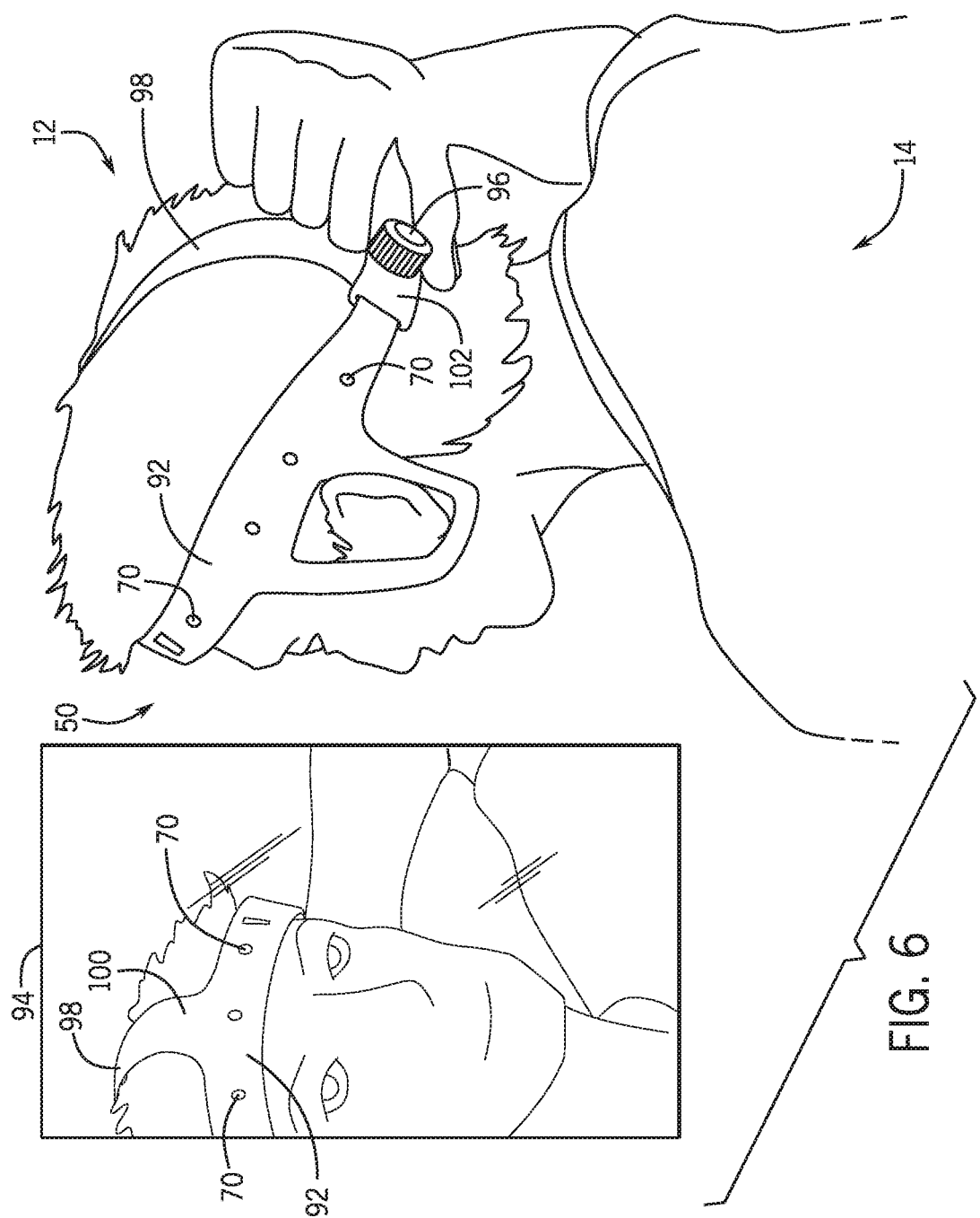
FIG. 6 is a perspective view of a user adjusting an embodiment of a scaffolding system headpiece, in accordance with an aspect of the present disclosure.

FIG. 6 is a perspective view of a user adjusting an embodiment of a headpiece 50 of the scaffolding system 12 having an adjustable headband 92 in front of a mirror 94. In the depicted embodiment, the headpiece 50 may be manufactured out of two or more components as opposed to being a one piece headband. Accordingly, a component such as knob 96 may be used to provide for user adjustment of the headband 92 included in the headpiece 50. For example, turning the knob 96 in a first direction (e.g., counterclockwise) may tighten the headband 92, while turning the knob 96 in a second direction opposite the first direction (e.g., clockwise) may loosen the headband 92.

In the depicted embodiment, the headpiece 50 includes a single band (e.g., crown band section) 98 connected to the headband 92 on a fore section 100 and an aft section 102. The headpiece 50 may also include earpiece sections 104 to aid in securing the headpiece 50 to the user 14. Also shown are magnets 70 which may be used to magnetically fasten the VR/AR display system 20 to the headpiece 50. As mentioned earlier, the magnets 70 may be electrically conductive, and thus may be used as conduits for signals and/or electric power. After donning of the headpiece (e.g., headpiece 50), the user 14 may attach one of the headwear, e.g., headwear 38. The user 14 may then for example, walk around the theme park and proceed to enter a passenger vehicle in a ride that includes VR/AR enhancements. The user 14 may then attach the VR/AR display system 20 to the headpiece (e.g., headpiece 50) when seated in the passenger vehicle 36, as shown in FIG. 7.

Figure 7:
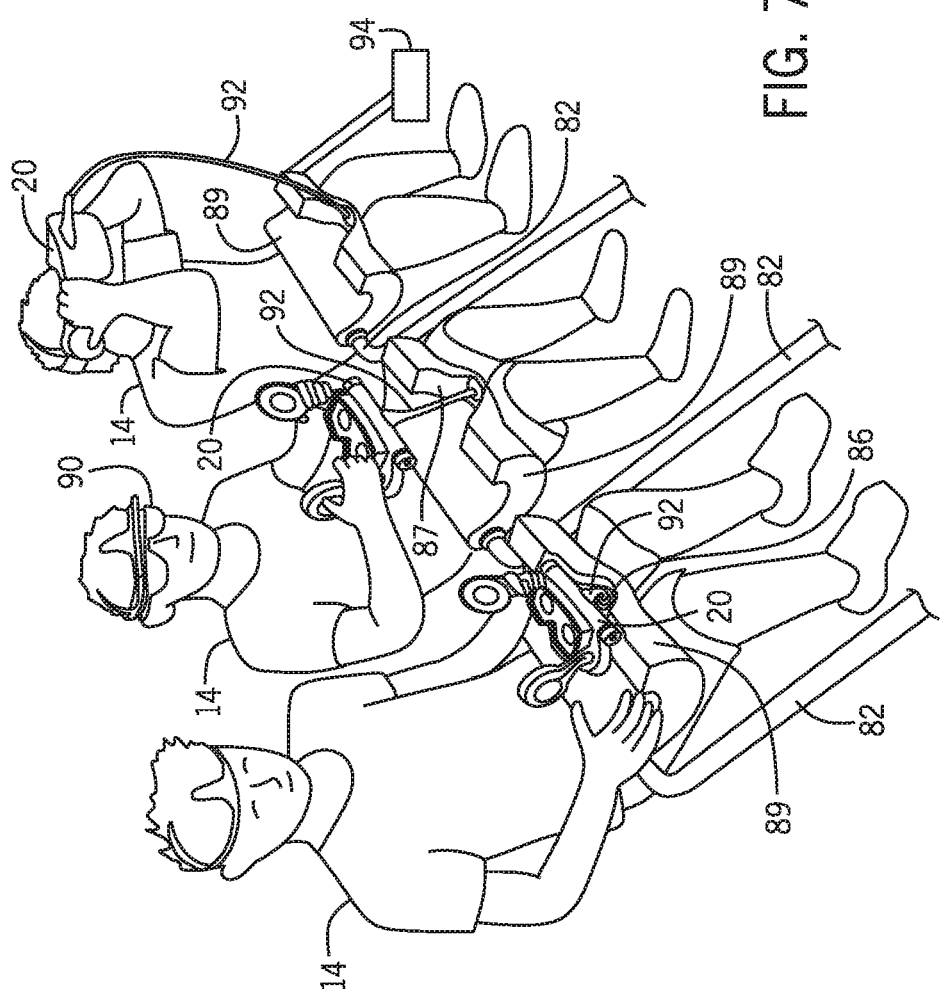
FIG. 7 is a perspective view of embodiments of the rapid deployment virtual reality/augmented reality system of FIG. 1 worn by users, in accordance with an aspect of the present disclosure.

FIG. 7 is a perspective view an embodiment of the VR/AR display system 20 used in conjunction with the amusement ride passenger vehicle 36 with users 14 seated in the passenger vehicle 36. As depicted, the users 14 are secured inside the passenger vehicle 36 with locking lap bars, 82, 84. As shown, lock bar 80 has the VR/AR display system 20 secured inside a cavity 86, suitable for storing the VR/AR display system 20 in the passenger vehicle 36. More specifically, the cavity 86 is disposed in a lap bar cummerbund 88. The passenger 14 secured via the locking lap bar 82 is shown as removing the VR/AR display system 20 from the locking lap bar 82 to place the VR/AR display system 20 on the scaffolding system 12. The passenger 14 secured via the locking lap bar 82 is also shown wearing a headpiece 50 including glasses (e.g., prescription glasses) 90, which may be kept on and used in conjunction with the scaffolding system 12 and the VR/AR display system 20.

The user 14 secured via the locking lap bar 84 is shown as mating the VR/AR display system 20 with the scaffolding system 12. In the depicted embodiment, the VR/AR display system 20 includes one or more umbilical conduits 92 that may be used to transmit electrical signals and/or power to external computing devices located in the multi-passenger vehicle 36 or communicatively and/or operatively coupled to the multi-passenger vehicle 36. The umbilical conduits 92 may retract (e.g., via spring bias mechanism, electric motor assist, gravity assist, and so on) into respective locking lap bars 80, 82, 84 and, in some embodiments, into a cable reservoir 94. By providing for a more efficient storage and deployment of the VR/AR display system 20, the techniques described herein may enable a higher flow of passengers 14 through a VR/AR ride, and may improve the user 14 experience in the theme park.

Figure 8:
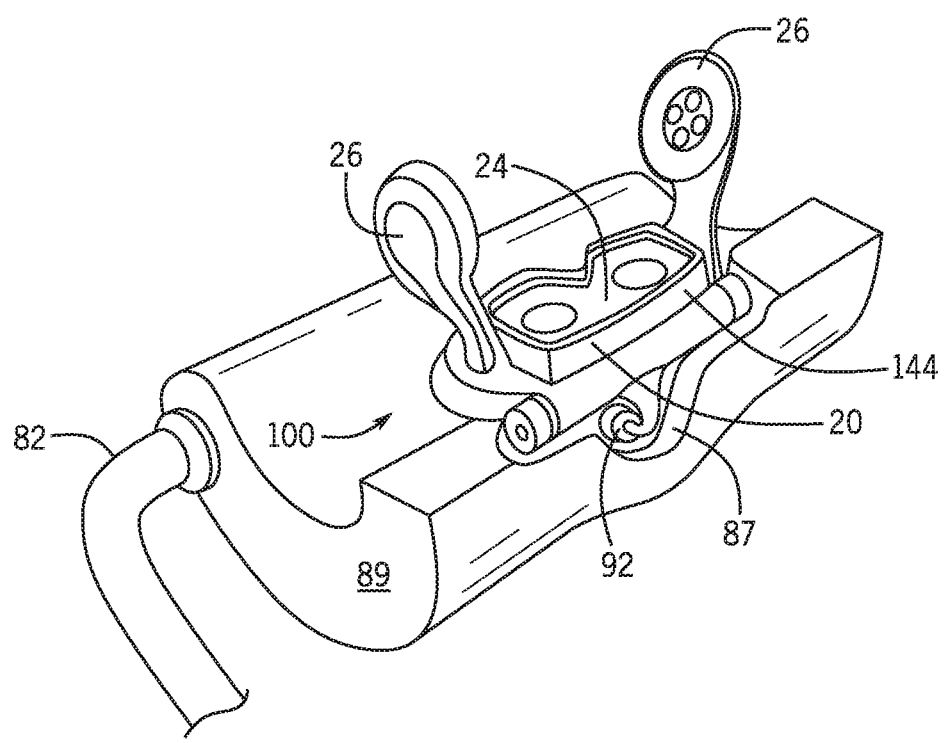
FIG. 8 is a perspective front view of an embodiment of a locking lap bar included in a passenger seat system, the locking lap bar including components of the rapid deployment virtual reality/augmented reality system of FIG. 1, in accordance with an aspect of the present disclosure.

FIG. 8 is a perspective view of an embodiment of the locking lap bar 80 showing further details. In the depicted embodiment, the VR/AR display system 20 is shown stored in the cavity 86 before use by the users 14. As mentioned earlier, the VR/AR display system 20 may include the umbilical conduits 92 which may retract via spring bias mechanism, electric motor assist, gravity assist, and so on, internally inside the locking lap bar 80, the lap bar cummerbund 88, and/or the cable reservoir 94, aiding in more securely attaching the VR/AR display system 20 into the cavity 86. Magnets may also be used to fasten the VR/AR display 20 inside of the cavity 86.

The lap bar cummerbund 88 may include a trench (e.g., curved trench) 100. Spills, rain, and the like, encountered during the theme ride, may be funneled away from the VR/AR display system 20 via the trench 100. Because of its curved shape (e.g., scallop shape), the trench 100 may also facilitate cleaning any spills and improving maintenance turnaround. Additionally, the lap bar cummerbund 88 may be manufactured out of metals, plastic, or combinations thereof, having a material and/or surface coating suitable for withstanding spills, outdoor exposure, and improving cleaning. Accordingly, maintenance personnel may more quickly clean the multi-passenger vehicles 36, improving turnaround times and ride availability time.

The lap bar cummerbund may, when disposed over the user's lap to secure users 14 during the theme ride, position the VR/AR display system 20 as shown for easy access and deployment. Indeed, the users 14 may enter the passenger vehicle 36, lock the locking lap bar 80, and then be presented with the VR/AR display system 20 positioned on their lap. Pulling outwardly on the VR/AR display system 20 may remove the VR/AR display system 20 from the cavity 86 for mating with the scaffolding system 12. The VR/AR display system 20 may thus be easily removed via manual manipulation and mated onto the scaffolding system 12. Once mated with the scaffolding system 12, power, data, and so on, may be provided to the VR/AR display system 20 while in use via the umbilical conduits 92. The VR/AR display system 20 may then provide visual sensory experiences via the display 24, and auditory sensory experiences via the audio system 26.

Figure 9:
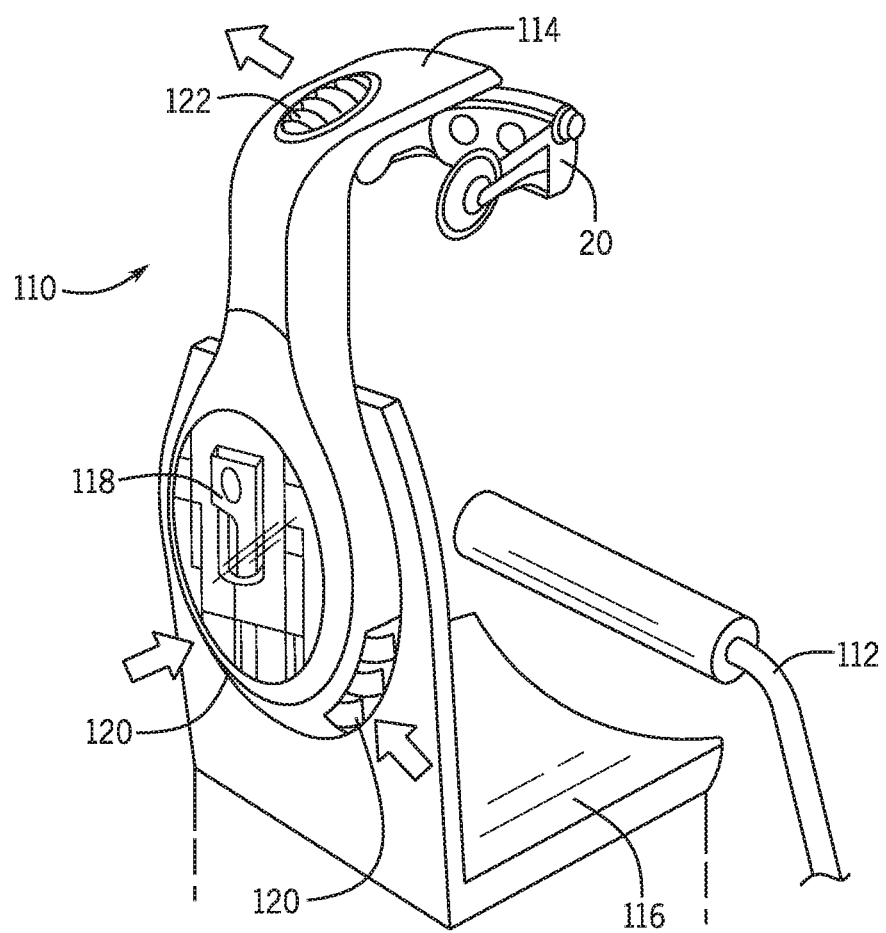
FIG. 9 is a perspective rear view of an embodiment of a passenger seat system including components of the rapid deployment virtual reality/augmented reality system of FIG. 1, in accordance with an aspect of the present disclosure.

FIG. 9 is a perspective rear view of an embodiment of a passenger seat system 110 having a locking lap bar 112. In the depicted embodiment, the VR/AR display system 20 is stored overhead, and more specifically, on a "hanging" overhead ledge 114 of the passenger seat system 110. In use, the user 14 would enter the passenger seat system 110 and sit down on a seat 116. The user 14 may then be secured in place via the locking lap bar 112 and subsequently retrieve the VR/AR display system 20, for example, by reaching up and pulling downwardly, and then mate the VR/AR display system 20 to the scaffolding system 12. As mentioned earlier, the VR/AR display system 20 may include the umbilical conduits 92, which may use a spring bias, an electric motor, and so on, to aid in securing the VR/AR display system 20 to the overhead ledge 114. Magnets may additionally or alternatively be used to aid in securing the VR/AR display system 20 to the overhead ledge 114.

Also shown are one or more computing devices 118 which may be disposed in the passenger seat system 110. The computing devices 118 may communicatively and/or operatively interface with the VR/AR display system 20 to provide VR and/or AR environments to the user 14 as the user 14 goes through the theme park ride. In the depicted embodiments, intake vents 120 provide for the entry of cooling air suitable for lowering a temperature of the computing devices 118 during operations. The cooling air may then exit the passenger seat system 110 through exhaust vents 122 as heated air. After the theme ride is over, the user 14 may detach the VR/AR display system 20 from the scaffolding system 12, and may then return the VR/AR display system 20 to the overhead ledge 114 for cleaning and/or for subsequent use.

Figure 10:
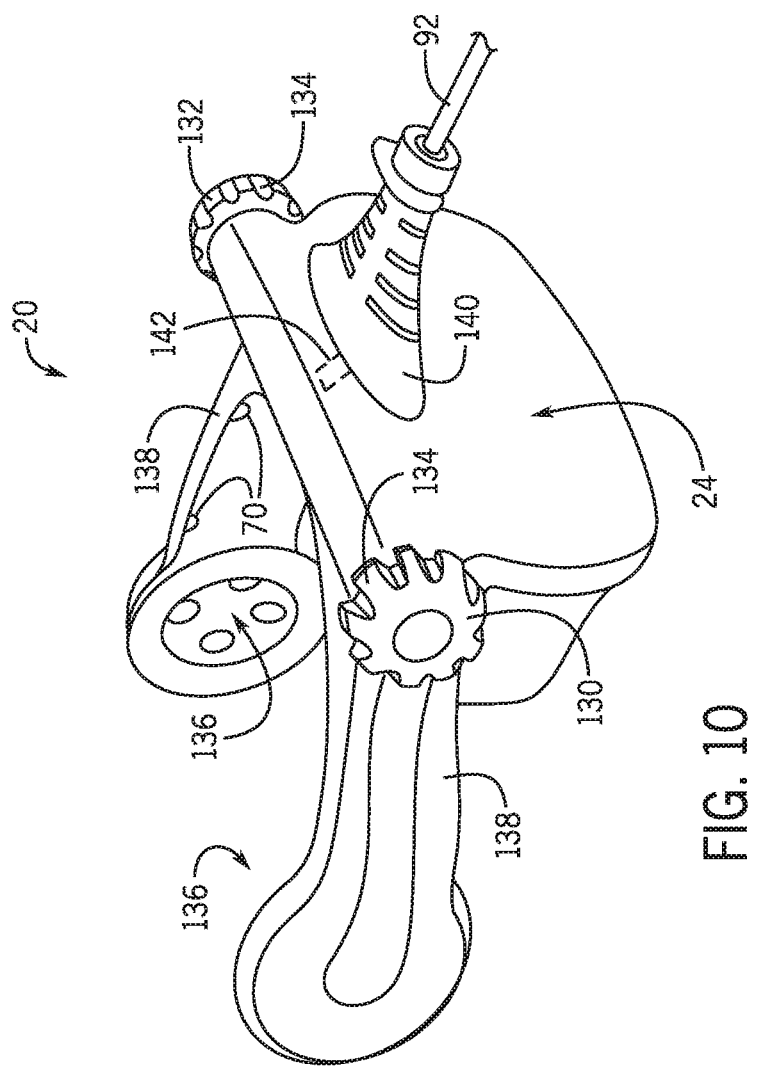
FIG. 10 is a perspective view of an embodiment of a virtual reality/augmented reality display system in accordance with an aspect of the present disclosure.

The VR/AR display system 20 may include certain features, as shown in FIG. 10, that may improve usability and/or maintenance. For example, knobs 130, 132 may be provided to more easily focus and adjust the display system 24. More specifically, the knob 130 may be used for focusing while the knob 132 may be used for adjusting an interpupilary distance of the user 14. The knobs 130, 132 may include knurls 134 for improved manipulation and tactile feedback. The knobs 130, 132 may also provide for a more understandable adjustment interface across varying demographics and countries of origin of the users 14.

The audio system 26 may include speaker arrays 136, which may provide for binaural audio, surround sound, and so on, as well as one or more microphones. The audio system 26 may be, in certain embodiments, a separate and standalone system from the VR/AR display 20. That is, in some embodiments, the audio system 26 may include speaker arrays and/or microphones that may be worn by themselves. Temples 138 included in the VR/AR display 20 may also act as handles suitable for both securing the speaker arrays 136 proximate to the passenger's ears as well as for holding or otherwise manipulating the VR/AR display 20. The temples 138 may also include one or more magnets 70, which may aid in securing the VR/AR display system 20 to the scaffolding system 12. The umbilical system 92 may include a flexible boot 140 which may enable a quick connection/disconnection of the umbilical system 92 from the VR/AR display system 20. Indeed, the umbilical conduit system 92 may include a connector 142, such as an HDMI connector, USB, USB-C, Thunderbolt, or a combination thereof. Accordingly, the umbilical conduit system 92 may deliver electric power, video, audio, text, images, and so on, to the VR/AR display system 20. The umbilical conduit system 92 may also transmit certain information derived from the VR/AR display system 20, such as a location in the display 24 that the user 14 is looking at, pupil dilation, head movement, head angle, and so on.

The VR/AR display system 20 may additionally include certain features useful in cleaning and maintenance. For example, the VR/AR display system 20 may include an outer shell 144 made of materials such as acrylonitrile butadiene styrene (ABS), phthalate-free polyvinyl chloride (PVC), polyethylene terephthalate (PET), low-density polyethylene (LDPE), polypropylene, silicone, polyamide, plastics of various types, metals, and the like, for improved cleaning and for enhancing protection form the elements. The VR/AR display system 20 may additionally minimize or eliminate user contact with certain components, such as display 24 screens, electronics, audio gear, and so on. Accordingly, the VR/AR display system 20 may have an improved number of operating hours.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure. While certain disclosed embodiments have been disclosed in the context of amusement or theme parks, it should be understood that certain embodiments may also relate to other uses. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a headgear; and
a headpiece configured to be worn by a user, the headpiece comprising:
a set of mechanical fasteners configured to fasten and unfasten the headgear to the headpiece;
a set of magnetic fasteners configured to fasten and unfasten a head-mounted virtual reality/augmented reality (VR/AR) display system to the headpiece; and
a knob configured to adjust a configuration or size of the headpiece.

2. The system of claim 1, wherein the headpiece comprises a headband section and wherein the knob is positioned in an aft position on the headpiece.

3. The system of claim 1, wherein the headpiece is configured for coupling to a particular headgear of a plurality of headgears.

4. The system of claim 1, wherein the headpiece is configured for coupling to any headgear of a plurality of headgears including the headgear.

5. The system of claim 1, wherein the set of magnetic fasteners are distributed across a front portion of the headpiece.

6. The system of claim 1, wherein a front portion of the headpiece comprises a protrusion configured to mate with a corresponding recess of the head-mounted VR/AR display system.

7. The system of claim 1, wherein the headpiece comprises a forehead shelf section configured to mate with the set of magnetic fasteners.

8. The system of claim 1, wherein a portion of the set of magnetic fasteners are located on a brim of the headpiece.

9. The system of claim 1, comprising the head-mounted VR/AR display system, wherein the head-mounted VR/AR display system comprises a corresponding set of magnetic fasteners configured to mate with the set of magnetic fasteners.

10. The system of claim 1, wherein the headgear comprises a visor.

11. A system comprising:
a headpiece configured to be worn by a user, the headpiece comprising:
a set of mechanical fasteners that fasten a headgear to the headpiece;
a set of magnetic fasteners configured to fasten and unfasten a head-mounted virtual reality/augmented reality (VR/AR) display system to the headpiece;
a knob configured to adjust a configuration or size of the headpiece; and
a headband section.

12. The system of claim 11, wherein the set of magnetic fasteners are positioned on a brim of the headpiece.

13. The system of claim 11, wherein the set of magnetic fasteners are distributed across the headband section of the headpiece, wherein the headband section is configured to surround a portion of a head of the user when the headpiece is worn.

14. The system of claim 11, wherein the headpiece comprises a curved portion configured to extend from the headband section of the headpiece and wherein the knob is coupled to the headband section of the headpiece.

15. The system of claim 11, wherein the headgear is fastened to the headpiece and wherein the headgear, when fastened, is configured to enable one or more features of the head-mounted VR/AR display system.

16. The system of claim 11, wherein the head-mounted VR/AR display system is fastened to the headpiece and wherein the headgear is fastened to the headpiece.

17. The system of claim 11, wherein the headgear comprises a visor.

18. A method for configuring a scaffolding system, the method comprising:
receiving a headpiece of the scaffolding system, the headpiece comprising a first set of fasteners configured to be fastened to a headgear and a second set of fasteners configured to be fastened to a head-mounted virtual reality/augmented reality (VR/AR) display system;
selecting a headgear from a set of headgears to fasten to the headpiece of the scaffolding system, wherein each headgear from the set of headgears has mating features complimentary to the first set of fasteners; and
fastening the headgear to the headpiece via the first set of fasteners and not the second set of fasteners.

19. The method of claim 18, comprising fastening the head-mounted VR/AR display system to the headpiece via the second set of fasteners.

20. The method of claim 18, wherein the headgear comprises a visor.

* * * * *